March 3, 1959    V. A. MILLER ET AL    2,876,203
EMULSION POLYMERIZATION WITH POLYBASIC ACID SOAP Filed July 20, 1953      2 Sheets-Sheet 1

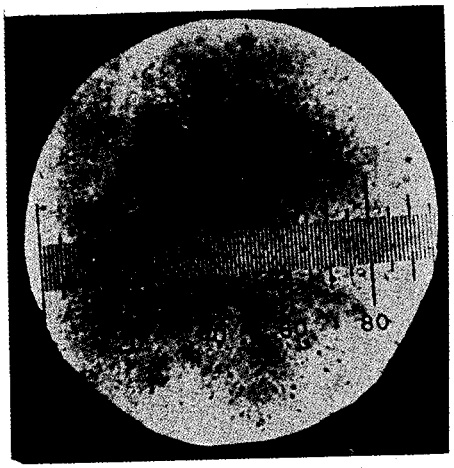

FIG. 1 EMULSIFIER
POTASSIUM OLEATE

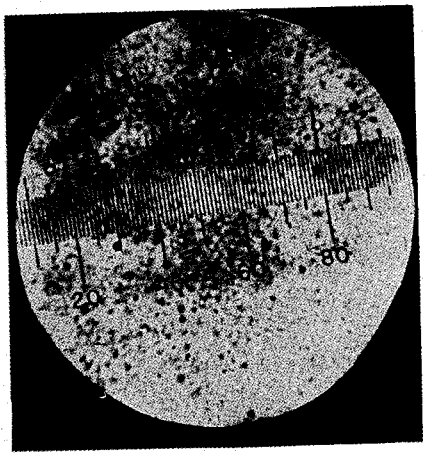

FIG. 2 EMULSIFIER
POTASSIUM LAURATE

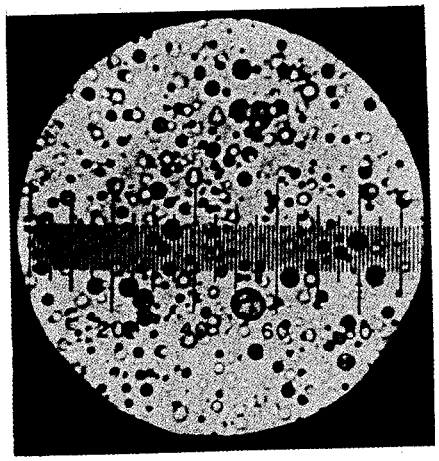

FIG. 3 EMULSIFIER
POTASSIUM SALT OF DIMERIZED
LINOLEIC ACID

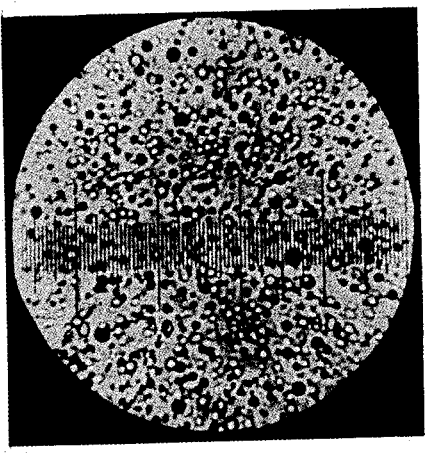

FIG. 4 EMULSIFIER
POTASSIUM SALT OF
HYDROGENATED DIMERIZED LINOLEIC ACID

PHOTOMICROGRAPHS OF HIGH SOLIDS,
LOW TEMPERATURE LATICES
(70/30 BUTADIENE / STYRENE) TAKEN
UNDER 950 x MAGNIFICATION
(SCALE UNIT = 6600 Å)

INVENTOR.
VERLE A. MILLER
RICHARD O. BECKER
BY
ATTORNEY

March 3, 1959 V. A. MILLER ET AL 2,876,203
EMULSION POLYMERIZATION WITH POLYBASIC ACID SOAP
Filed July 20, 1953 2 Sheets-Sheet 2

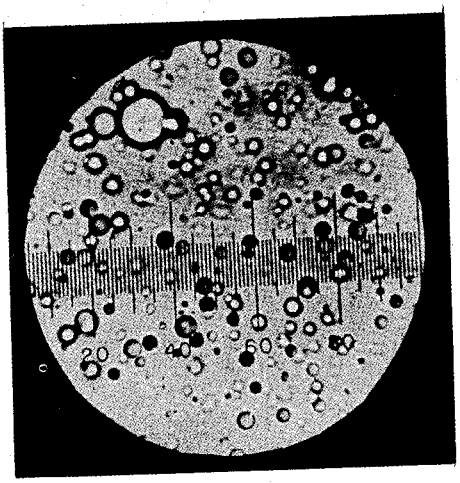

FIG. 5  70/25/5 BUTADIENE/STYRENE/METHYL/METHACRYLATE EMULSIFIED WITH POTASSIUM SALT OF DIMERIZED LINOLEIC ACID

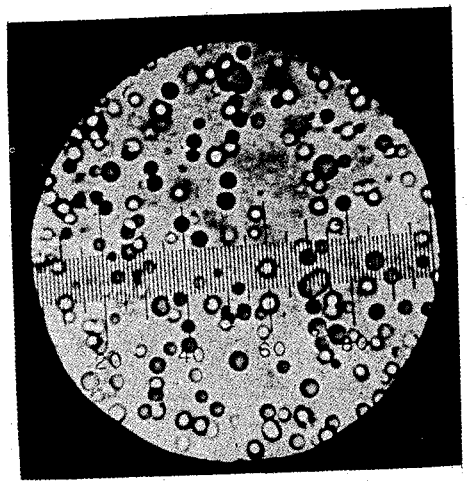

FIG. 6  70/30 BUTADIENE/STYRENE EMULSIFIED WITH POTASSIUM SALT OF HIGH TRIMER CONTENT POLYMERIZED LINOLEIC ACID.

PHOTOMICROGRAPHS OF HIGH SOLIDS, LOW TEMPERATURE LATICES TAKEN UNDER 950× MAGNIFICATION.
(SCALE UNIT = 6600 Å)

INVENTOR.
VERLE A. MILLER
RICHARD O. BECKER
BY
ATTORNEY.

2,876,203
Patented Mar. 3, 1959

2,876,203

EMULSION POLYMERIZATION WITH POLYBASIC ACID SOAP

Verle A. Miller, Dover, Del., and Richard O. Becker, Syracuse, N. Y., assignors to International Latex Corporation, Dover, Del., a corporation of Delaware Application July 20, 1953, Serial No. 369,171

13 Claims. (Cl. 260—23.7)

This invention relates to the polymerization of unsaturated organic compounds, such as butadiene, styrene, acrylonitrile or methylmethacrylate, and copolymers thereof in aqueous emulsion and is particularly concerned with such polymerization reactions when effected under conditions that result in high solids latices at faster reaction rates and/or low viscosity of the resulting emulsions.

The high and variable cost of natural latex (i. e., an aqueous emulsion of a natural elastomer) and its inadequate supply due to unsettled world conditions have stimulated a large amount of research directed to the preparation of a relatively inexpensive and readily available synthetic rubber latex to supplement or replace natural latex. A commercially important form of natural latex is a high solids latex which typically comprises rubber solids contents amounting to more than about forty percent and, for most uses, about sixty percent or more. (As used herein, "solids content" refers to the weight percent of the solids based on the weight of the latex.) The large tonnage of such latex required for many purposes has been obtained commercially by various methods for concentration of the natural latex, which contains about 30 percent rubber solids, such as by evaporation, centrifuging and creaming. Attempts to concentrate low solids synthetic latices prepared by known processes (e. g., processes used in Government rubber program to produce GR–S rubber) by the first two of the previously enumerated methods used for concentrating natural latex have produced only latices of high viscosity; indeed, in many instances, the viscosity of the latex increased so rapidly that the latex was not commercially useful at a solids content well below that required for most commercial uses. Although dilute GR–S latices can be creamed to yield useful high solids latices, the successful application of this method necessitated preliminary agglomeration with acids or other electrolytes before the addition of a creaming agent. On a commercial scale, this was a difficult and costly operation and a significant amount of polymer was normally lost in the serum.

Attempts to polymerize synthetic latices having high solids contents by reducing the water content of the polymerization recipe and using a conventional amount of emulsifier encountered the difficulty that the viscosity of the reaction mixture increased during the reaction so rapidly that the entire emulsion became a thick paste and the temperature rose in an uncontrollable manner because of poor heat transfer. Attempts to overcome this difficulty by using special types of agitation, vaporizing volatile monomer and recycling condensed monomer, and controlling the polymerization reaction by adding latex seed particles to the reaction system did not solve the problem. Recently, high solids latices have been produced by employing recipes containing sharply reduced amounts of emulsifier; such latices have viscosities in the upper portion of the useful range but can be produced only by excessively long reaction times, typically over two days. Such long reaction times result in inefficient use of equipment with attendant high production costs.

It has now been discovered that synthetic latices of improved characteristics, including high solids content such as a solid elastomer content of at least about forty percent, and low viscosities can be obtained in aqueous emulsion polymerization systems in relatively short reaction times by employing a polyfunctional high molecular weight organic compound for emulsification of the monomeric material to be polymerized. Organic compounds found effective have been polyfunctional emulsifiers in that they contain a plurality of groups having high emulsifying power. Typical of such groups, when alkaline systems are involved, are acid groups, such as carboxylic acid groups. Such polyfunctional emulsifiers should have molecular weights of the order of 300 to 400 and more, such as 600 to 1000, so that they are high molecular weight compounds and hence have adequate emulsifying power although having low enough molecular weights that they have the requisite of adequate solubility in the aqueous phase. Polybasic acid derivatives of hydrocarbons of adequate molecular weight fall within the class described above and can be conveniently prepared by polymerization of unsaturated fatty acids having at least 10 carbon atoms.

Such polymerizations can be effected by the use of known polymerization catalysts, such as the Friedel-Crafts type of catalyst including aluminum chloride, boron trifluoride, hydrofluoric acid and the like, or by montmorillonite clays or silica-alumina gels, or can be effected principally or completely by heat, the latter type of polymerization occurring more readily when the fatty acid is polyunsaturated. Typical of polymerizable acyclic, aliphatic polyunsaturated acids are linoleic or its conjugated isomer, both of which yield the same dimer; octadecatrienoic acids, e. g., eleostearic and linolenic; and hiragonic (hexadecatrienoic) acid. A particularly effective emulsification agent was found to be the polymer resulting from the dimerization of linoleic acid (9,12-octadecadienoic acid), which forms dilinoleic acid under specific conditions, particularly with regard to heating under pressure in the presence of water, as described in U. S. Patent 2,482,761, issued September 27, 1949, in the name of C. G. Goebel. The dimer so produced is believed to be a dibasic acid derivative of a substituted cycloakenyl hydrocarbon of the following structure:

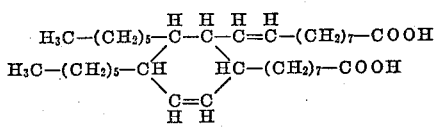

Since the last named material is the only commercially available example of its class, the present invention will be described principally in terms of its use.

Methods for producing polycarboxylic acids or esters thereof by polymerization of polyene fatty acids or esters are also disclosed in U. S. Patent 2,379,413, issued July 3, 1945, in the name of T. F. Bradley. As disclosed therein, the esters of unsaturated polymerized polyene fatty acids can be hydrogenated to yield esters of saturated polymers; such esters, on hydrolysis, yield dicarboxylic or polycarboxylic acids of saturated hydrocarbons. Such acids may be employed, after conversion to an alkali salt, as emulsifying agents for the emulsion polymerizations described herein. As will be understood by those skilled in the art, compounds similar in structure to the above polybasic acid derivatives of non-benzoid hydrocarbons can be synthesized by known methods.

The present invention is applicable to the preparation of high molecular weight, rubber-like to resinous polymers and copolymers obtained from polymerizable ethylenic monomers (i. e., compounds containing an active

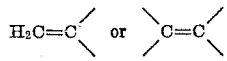

group). Exemplary of such monomers are relatively low molecular weight conjugated diolefine typically having from 4 to 6 carbon atoms and their polymerizable derivatives (e. g., butadiene, isoprene or 2,3-dimethyl-butadiene-1,3); monoethylenically unsaturated compounds, such as acrylonitrile and its derivatives, esters of acrylic or substituted acrylic acids, vinyl aromatic hydrocarbons, such as styrene, methylstyrene, vinyltoluene and vinylnaphthalene or vinylpyridine. The use of various polymerizable ethylenic monomers to form polymers and copolymers and the resulting properties of such polymeric materials are well known to the art and hence need not be repeated here.

As is well known to those skilled in the art, an aqueous emulsion polymerization system is prepared by emulsifying selected monomeric material with an amount of water that will result in the desired solids content in the finished latex, due consideration being given to the percentage of conversion obtained in the reaction and to the removal of unreacted monomer, if any, in the ensuing stripping operation. Polymerization of the monomeric material is typically effected by a small amount, such as from about 0.1 to 3 percent (based on the monomers), of a free radical producing agent, such as a per-type or an oxidizing catalyst exemplified by persulfates or perborates of sodium, potassium or of ammonium, hydrogen peroxide, or oil soluble organic peroxides, such as benzoyl peroxide or di-t-butyl peroxide, alkaryl hydroperoxides (e. g., hydroperoxides of cumene, diisopropylbenzene, or di-t-butyl-benzene), cycloalkaryl hydroperoxides (e. g., cyclohexylbenzene hydroperoxide) or terpene hydroperoxides (e. g., p-menthane hydroperoxide).

Such a system is advantageously activated by auxiliary reducing agents such as ferrous salts either in the presence or absence of sugars or formaldehyde sulfoxylates, or polyethylene polyamine compounds, such activated systems being commonly referred to as "redox" systems. It is also known that it is desirable to have in such systems a polymerization modifier such as an aliphatic mercaptan having from six or preferably eight to eighteen carbon atoms per molecule, e. g., dodecyl mercaptan, tri-iso-butylene mercaptan, or mixtures of primary or tertiary $C_{10}$ to $C_{18}$ mercaptans, the amount of modifier generally being between about 0.05 to 2 percent, according to the plasticity desired in the final product. Catalysts, activators and modifiers other than those listed are known, as well as the conditions under which they are used. Accordingly, one skilled in the art will understand how to apply them to the present invention.

Polymerization can be effected by agitating the aqueous emulsion or reaction mixture in a closed reactor maintained at temperatures of from about 5° C. to 100° C. until the desired extent of conversion is obtained. Polymerization temperatures below 5° C., such as from —40° to 0° C., can be employed by adding a freezing point depressant, such as methanol, to the reaction mixture. It is one of the advantages of the present invention that use of the emulsifying agents described herein permit the use of low temperature reactions, with their well known advantages particularly in regard to the desirable properties of rubber polymer or copolymer produced thereby, while maintaining reaction rates that make the use of the low temperature process to obtain high solid latices commercially feasible. In relatively high temperature reactions, the increased rate of polymerization afforded by use of the present invention resulted in increased through-put of material as compared with prior art processes.

The reaction need not be carried to completion but may be terminated, at any desired conversion, so that desired physical properties are obtained. When the polymerization has reached the desired degree of conversion, any suitable short-stopping agent that is desired can be added. The reaction mixture is vented, before or after addition of the short-stopping agent, such as salts of dimethyldithiocarbamic acid, and stripped of residual monomer in appropriate equipment when such stripping is desired. In polymerizations short-stopped before total conversion, the present invention affords the distinct advantage of easy removal of residual monomers because of the low viscosity of the reaction mixture and the attendant minimization of the foaming troubles that have occasioned considerable difficulty in presently known processes. The stripped latex is easily concentrated, by known methods, to a solids content of about 60 percent or more.

The resulting latex, after addition of suitable antioxidants and/or stabilizers where desirable, may then be employed in a formulation for paints or can be blended with other latex, either natural or synthetic, to yield a latex having a solids content suitable for the production of deposited latex articles, such as gloves, baby pants and the like or may be employed without blending for such purpose. Such latex is particularly useful in the manufacture of sponge products. Additionally it can be used for paper coating, the production of toys, sheets and the like. It will be understood that the composition and physical properties of the latex will be varied according to the final use of the product.

Figure 1 shows a photomicrograph of a high solids, low temperature latex (polymerized from 70% butadiene and 30% styrene) taken under 950 times magnification, in which the emulsifier used in the polymerization was potassium oleate.

Figures 2, 3 and 4 are photomicrographs similar to Figure 1 for the same system, in which the emulsifier is potassium laurate, the potassium salt of dimerized linoleic acid and the potassium salt of hydrogenated dimerized linoleic acid, respectively.

Figure 5 is a photomicrograph similar to Figure 1 of a latex prepared from 70% butadiene, 30% styrene and 5% methyl methacrylate, which was emulsified with a potassium salt of dimerized linoleic acid.

Figure 6 is a photomicrograph similar to Figure 1 for a similar system in which the emulsifier was the potassium salt of a high trimer content polymerized linoelic acid.

In order to illustrate the present invention but not to be construed as a limitation thereof, the examples set forth below are given. The following general recipe was used in these specific examples, any variations from this general recipe being specifically stated in the example concerned.

TABLE I.—GENERAL POLYMERIZATION RECIPE

| | |
|---|---|
| Monomers | 100 |
| Water | 80 |
| Emulsifying agent (as stated) | 0.5 to 3.0 |
| Inorganic salt (sodium sulphate) | 0.5 |
| Catalyst (diisopropylbenzene hydroperoxide) | 0.3 |
| Activator (diethylenetriamine) | 0.15 |
| Auxiliary stabilizer ("Daxad" 11, a sulfonated naphthalene formaldehyde condensation product from Dewey and Almy Chemical Co.) | 1.5 |
| Modifier (t-dodecylmercaptan) | 0.15 |

All amounts given are parts by weight.

The above recipe was used in accordance with the following general procedure, any deviations from the procedure being set forth in the specific examples concerned.

General procedure

An aqueous solution (approximately 20 percent) of the emusifying agent was first placed in the reaction vessel, after which was added the stated amount of water (minus the water in the solution of the emulsifying agent) together with auxiliary emulsifier and inorganic salt, if the latter were included in the recipe. The total amount of catalyst was then added to the vessel, preferably dissolved in a portion of any relatively non-volatile monomer and followed by addition of the remainder of the relatively non-volatile monomer in which the modifier was dissolved. Relatively volatile monomer, typically butadiene, was then added to the vessel, which was purged to remove air. The vessel was then sealed and brought to reaction temperature, while agitating the reaction mixture so as to form an emulsion, after which a solution of the activator was injected.

Small samples of the emulsion were withdrawn from the vessel, without interrupting the reaction, at periodic intervals and the amount of reacted monomers determined, by a standard method for solids determination. From these data the rate of reaction and/or extent of conversion was calculated.

When the reaction had reached the desired extent of conversion, a dimethyldithiocarbamate salt was injected to short-stop the reaction and the vessel pressure released. Removal of any remaining monomers and/or concentration of the latex was effected by vacuum stripping.

The viscosities of both stripped and unstripped samples of the reacted emulsions or latices were measured using a Brookfield "Synchro-Lectric" viscometer (Model LVF), the spindle and the velocity of rotation used being varied with the viscosity of the latex, as indicated in the following tables. Although the viscosity of a steam stripped latex at high solids content is important for consideration in end uses of the latex, the viscosity of the monomer swollen latex is a better indication of the difficulties encountered due to thickening of the emulsion in the reactor. Since the latter is a limiting factor in the preparation of high solids latices, attempts to improve the viscosity of the emulsion during reaction were followed by Brookfield viscosity determinations on vacuum vented but unstripped latices. Viscosity measurements made with highly viscous, monomer swollen latices varied considerably according to the speed and spindle used in the test; much less variation occurred after the latcies were steam stripped of unreacted monomers, or when the less viscous latices made in accordance with the improved recipes of this invention were evaluated either before or after stripping.

The method used for determining relative values of the total surface areas of the polymer particles in various latices was to titrate conductometrically a sample of latex (diluted with water and containing a known amount of solids) with a solution of emulsifier (of known concentration). The point at which the rate of change of conductivity per increment of added emulsifier abruptly changes was determined graphically and represents the point at which the surface of the particles is completely saturated. A quantity functionally related to the total surface was then calculated from the summation of the amount of emulsifier known to be present at the start of the titration and the graphically determined amount of emulsifier added during the titration to effect surface saturation.

The markedly improved results obtained in the polymerization of high solids butadiene-styrene latices resulted, in accordance with a specific aspect of this invention, in the substitution, wholly or partially, of conventional monobasic fatty acid or rosin soaps by similar amounts, for example, between about 0.3 to 5.0 parts by weight per 100 parts by weight of monomers, of an alkali salt of a dicarboxylic acid, dimerized linoleic acid.

Although the potassium salt was employed in the following examples, other alkalis, such as sodium or ammonium, produce effective emulsification agents. It was found desirable to prepare the alkali salt of the dimerized linoleic acid to be used as an emulsifying agent under controlled conditions in order to insure consistent and predictable results in the ensuing polymerization. Thus, if the liquid dimerized linoleic acid is neutralized with an alkali, such as aqueous potassium hydroxide, at room temperature, the neutralization is slow and incomplete; whereas, if the two reactants are heated together while being agitated the resulting emulsifying agent frequently causes the polymerization to be either exceedingly slow or inhibited. It is preferred to combine the heated reactants, with agitation, under a blanket of nitrogen so that almost instantaneous neutralization is obtained, after which the solution of emulsifying agent is rapidly cooled in a water bath. An emulsifying agent so prepared gives rapid and reproducible polymerizations. Effectively but less conveniently the heated reactants can be combined with agitation in an apparatus in which a vacuum is maintained. Indeed a satisfactory emulsifying agent was obtained when the heated alkali solution was added with agitation to cold dimerized linoleic acid, using a short time of agitation, such as five minutes or less, in which time the product became homogeneous, and the solution of the alkali salt was rapidly cooled in a water bath. Other agents for blanketing the heated and agitated mixture during reaction with a non-oxidizing atmosphere, such as steam, may also be used. Another effective method of neutralizing the dimerized linoleic acid with alkali under controlled conditions is to combine the two reactants in a system completely filled with liquid, such as by passing the combined reactants through a conduit or pump in which highly turbulent flow is maintained.

EXAMPLE I

Monomers consisting of 70 parts butadiene and 30 parts styrene were polymerized at 5° C. in accordance with the general recipe and procedure given above, using 3.0 parts of the potassium salt of dimerized linoleic acid (referred to in the tables also as K-dimer acid) prepared under controlled conditions, as discussed above. (The dimerized linoleic acid referred to in these examples was, except as otherwise stated, a commercially available material obtained from Emery Industries, Inc., Cincinnati, Ohio, under the designation "Emery 955 Dimer Acid" and stated by the producer to contain about 3 percent of the monomer, about 85 percent of the dimer and about 12 percent of the trimer of linoleic acid.) This polymerization reached 80 percent conversion (about 46–47 percent solids) in about 30 hours, the latex remaining fluid throughout the reaction (see viscosity data for latex No. 11 in Table II) in contrast to a polymerization identically run except for the use of 3.0 parts of potassium oleate which required almost 50 hours to reach the same percent conversion and which yielded a thick pasty latex that would not flow from the reaction vessel (note viscosity of unstripped latex No. 4 in Table II).

After stripping and concentration to 60 percent solids, the viscosity of the latex prepared with the potassium salt of the dimerized linoleic acid was still very low (about the same value as the latex prepared with potassium oleate after stripping and before concentration). This latex (No. 11) remained fluid after creaming to 71 percent solids and blended easily with natural latex.

Commercial latices made from 70 parts butadiene—30 parts styrene have been polymerized in recipes containing 1.5 parts of fatty acid and/or rosin soaps as initial emulsifier in order to reduce excessive thickening even though use of this amount of emulsifier resulted in a longer, slower polymerization. To obtain practical rates of reaction, these commercial preparations have been carried out at 10° rather than 5° C. even though better TABLE II.—VISCOSITY OF 70/30 BUTADIENE/STYRENE LATICES PREPARED USING DIFFERENT EMULSIFIERS
(3.0 PARTS POTASSIUM OLEATE)

| Latex Sample | Unstripped Latex | | | | | | Concentrated Latex | | | | | |
|---|---|---|---|---|---|---|---|---|---|---|---|---|
| | Solids, Percent | Brookfield Viscosity | | | | | Solids, Percent | Brookfield Viscosity (cp.)[a] | | | | |
| | | Spindle | 6 R.P.M. | 12 R.P.M. | 30 R.P.M. | 60 R.P.M. | | Spindle | 6 R.P.M. | 12 R.P.M. | 30 R.P.M. | 60 R.P.M. |
| 1-4[b] | 47.2– | 4 | 15,600–22,400 | 8,700–12,800 | 4,400–6,060 | 2,700–3,560 | [c] 48.0 | 1 | 57.0 | 55.0 | 57.6 | 58.2 |
| 1.5 PARTS POTASSIUM OLEATE IN INITIAL CHARGE | | | | | | | | | | | | |
| 5 | 45.0 | 3 | 1,620 | 1,170 | 628 | 420 | | | | | | |
| X–635[d] | | | | | | | 60 | 3 | 1,880 | 1,380 | 860 | 598 |
| X–710[d] | | | | | | | 59.9 | 3 | 4,300 | 3,000 | 1,660 | 995 |
| 3.0 PARTS POTASSIUM LAURATE | | | | | | | | | | | | |
| 6 | 49.3 | 4 | 30,200 | 17,000 | 7,880 | 4,720 | | | | | | |
| 3.0 PARTS POTASSIUM SALT OF DIMERIZED LINOLEIC ACID | | | | | | | | | | | | |
| 8 | 49.3 | 1 | 48.0 | 42.5 | 38.8 | 36.1 | | | | | | |
| 10 | 46.5 | 1 | 38.0 | 34.5 | 31.8 | 29.9 | | | | | | |
| 11 | 47.9 | 1 | 44.0 | 42.0 | 38.8 | 37.1 | 59.5 | 1 | 58.0 | 54.5 | 49.0 | 44.8 |

[a] Centipoises.
[b] Range of properties for four different runs.
[c] Data on composite of four runs, latex steam-stripped but not concentrated.
[d] Commercial samples which had been concentrated to 60% solids after polymerization to a solids content of about 48%.

strength in unloaded stocks normally is obtained with these latices as the polymerization temperature is lowered. Polymerization of X–635, a typical example of such commercial preparations emulsified with potassium oleate, requires about 50 hours to reach 80 percent conversion at 10° C. (X–635 and X–710, referred to below, are designations employed in the Government Reconstruction Finance Corporation rubber research program to identify high solids latices made with specific recipes.) Furthermore, the viscosity of this product after concentration to 60 percent solids is high and variable. Table II shows that the measured viscosity of a sample of this commercial product is an order of magnitude greater than the viscosities of latices of the present invention when measured on the same instrument. The latest latex of this type is X–710 which also is polymerized at 10° C. in a rosin-free fatty acid emulsified, amine-activated recipe but which is stopped at 70 instead of 80 percent conversion and then heat concentrated to a minimum of 58 percent solids. As shown in Table II, a sample of this commercially available product has a higher viscosity than that of X–635, when measured on the same instrument.

Samples of latex prepared using the above amount of potassium salt of dimerized linoleic acid were examined with an oil immersion microscope having a magnification of 950 times. The spherical latex particles, which were easily visible, were measured with a graduated eyepiece and found to have a particle size range of about 6600 A. to 33,000 A., with the greatest number of particles having a diameter of about 20,000 A. In contrast, relatively few particles were visible at this magnification in latex polymerized using potassium oleate as described and these particles had an average size of only about 6600 A. when similarly measured. A quite viscous sample of latex polymerized using 3.0 parts of potassium laurate (latex No. 6 in Table II) was composed of particles which were too small to be measured by this method and which appeared only as pin-point specks under the 950 times magnification. Figs. 1, 2 and 3 are photomicrographs of the above latices as seen under the microscope, under identical dilutions (5 percent) and identical magnifications and lighting conditions.

Additional evidence for the large average particle size of the latex polymerized in the presence of the potassium salt of dimerized linoleic acid was obtained by conductometric titration which indicated that the surface of the polymer particles of such latex was completely saturated by the addition of only 0.5 to 0.8 part of the potassium salt of dimerized linoleic acid per 100 parts of latex solids.

The low viscosity high solids latex of this invention was evaluated in gum stocks as cast and dipped films in blends with natural latex and compared with similar blends prepared from commercial X–635. As indicated in the data given below, the faster rate of reaction and the marked decrease in viscosity observed during polymerization of the latex of this invention (as compared with a comparable commercial latex) were achieved while producing an elastomer having physical properties superior to those of comparable commercial latices.

EVALUATION OF CAST FILMS FROM LATEX BLENDS

| Latex Blend, Natural/Synthetic | Elongation at Break, Percent | Tensile Strength, p.s.i. |
|---|---|---|
| BLENDS CONTAINING COMMERCIAL X–635 (POLYMERIZED AT 10° C. USING POTASSIUM OLEATE AS EMULSIFIER) | | |
| 90/10 | 750 | 4,000–4,320 |
| 75/25 | 700–750 | 3,800–4,140 |
| BLENDS CONTAINING A LOW VISCOSITY LATEX (POLYMERIZED AT 5° C. USING THE POTASSIUM SALT OF DIMERIZED LINOLEIC ACID AS EMULSIFIER) | | |
| 90/10 | 775 | 5,000–5,200 |
| 75/25 | 700 | 4,380–4,410 |

EXAMPLE II

The polymerization of Example 1, using 3.0 parts of the potassium salt of dimerized linoleic acid, was repeated using only 50 parts of water in the recipe and carrying the polymerization to only 75 percent conversion. A latex was produced which contained 52 percent solids and which was quite fluid as it came from the reactor.

Additional polymerizations indicated that the recipe, preferably with the amount of salt suitably adjusted to the amount of water, can be employed in polymerizations which yield latices containing over 60 percent solids before concentration.

EXAMPLE III (a) The polymerization of Example I, using 3.0 parts of the potassium salt of dimerized linoleic acid, was repeated, except that the amount of inorganic salt was progressively reduced, as shown in Table III. As can be seen from the data in Table III, the desirable reduction in the inorganic salt, used as electrolyte to lower the viscosity of the latex, to 0.1 part by weight was effected without substantially increasing the viscosity of the unstripped or stripped latex. Also reduction in the amount of inorganic salt used was accompanied by a moderate increase in the rate of polymerization, and a substantial increase in mechanical stability. Total elimination of added inorganic salt somewhat increased the viscosities of the unstripped latices and concentrated (after steam stripping) latices but resulted in a 50 percent reduction of preflocculation and a 20-fold increase in mechanical stability.

(b) "Daxad"-11 P was substituted for "Daxad"-11 in a series of polymerizations with progressively reduced amounts of inorganic salts, in the manner described in (a) of this example. "Daxad"-11 P is stated to contain virtually no inert inorganic salts and to be low in non-hydrocarbon impurities condensed with formaldehyde, whereas "Daxad"-11, contains about 5-10 percent of inert soluble inorganic salts, chiefly sodium sulfate, and varying amounts of condensed non-hydrocarbon impurities. As indicated by the data in Table III, a faster rate of polymerization and less prefloc accompanied this substitution. These effects were not observed when other stabilizers, including "Daxad"-12 K, "Tamol" N, or "Vultramine" R, were used under identical conditions. All these stabilizers gave results comparable to those obtained with "Daxad"-11.

TABLE III.—EFFECT OF REDUCED INORGANIC SALT AND PURIFIED AUXILIARY STABILIZER IN POLYMERIZATIONS USING POTASSIUM SALT OF DIMERIZED LINOLEIC ACID

LATICES POLYMERIZED USING "DAXAD" 11

| Latex Sample Number | Parts Na₂SO₄ | Hours to 80 Percent Conversion[d] | Prefloc, Percent[a] | Unstripped Latices[b] | | Concentrated Latices | | Mechanical Stability[c] of Concentrated Latex, percent |
|---|---|---|---|---|---|---|---|---|
| | | | | Solids | Viscosity[e] | Solids | Viscosity[e] | |
| 14 | 0.5 | 33.0 | 1.42 | 47.9 | 44-37 | 59.5 | 58-45 | 0.15 |
| 15 | 0.3 | 31.5 | 1.49 | 47.9 | 49-42 | 58.4 | 56-45 | 0.09 |
| 16 | 0.1 | 28.5 | 1.72 | 46.4 | 52-45 | | | |
| 17 | 0.0 | 28.5 | 0.74 | 46.9 | 95-86 | 58.5 | 75-70 | 0.007 |

LATICES POLYMERIZED USING "DAXAD" 11-P

| | | | | | | | | |
|---|---|---|---|---|---|---|---|---|
| 33 | 0.5 | 19.75 | 0.28 | 48.0 | 65-45 | | | |
| 35 | 0.3 | 16.25 | 0.49 | 47.4 | 86-61 | | | |
| 35A | 0.3 | | | | | 61.3 | 120-94 | |
| 36 | 0.1 | 15.75 | 0.09 | 47.8 | 170-112 | | | | a Weight percent based on monomers.
b After venting and at room temperature.
c Mechanical stability reported as percent of solids coagulated during beating for 10 minutes at highest speed in a Hamilton Beach mixer.
d At 5° C.
e Brookfield viscosity in centipoises, using spindle No. 1, at 6-60 R. P. M.

TABLE IV.—EFFECT OF AUXILIARY EMULSIFIER IN POLYMERIZATIONS USING THE POTASSIUM SALT OF DIMERIZED LINOLEIC ACID

| Auxiliary Emulsifier | Hours to 80 Percent Conversion[a] | Prefloc, Percent[b] | Unstripped Latex | | | Stripped and Concentrated Latex | |
|---|---|---|---|---|---|---|---|
| | | | Solids, Percent | Viscosity (cp.)[c] | Mechanical Stability,[d] percent | Solids, Percent | Viscosity (cp.)[c] |
| None | 33 | 1.5 | 47.9 | 44-37 | | 59.5 | 58-45 |
| 0.75 K-oleate [e] | 26.25 | 0.1 | 47.6 | 64-54 | | | |
| 0.5 K-laurate | 24.5 | 0.2 | 48.6 | 70-60 | | | |
| 0.5 "Nacconol" NRSF | 19 | 0.4 | 50.6 | 87-64 | 0.02-.05 | | |
| Do | 18.7 | 0.3 | | | | 60.5 | 115-80 | a At 5° C.
b Weight percent based on monomers.
c Viscosity range obtained at a spindle speed of 6-60 R. P. M. with a Brookfield viscosimeter with spindle No. 1.
d Mechanical stability given as percent of latex solids coagulated during beating for 10 minutes at the highest speed in a Hamilton Beach mixer.
e Potassium oleate prepared from Emery "Elaine" 233-LL.

EXAMPLE IV

The conditions and recipe of Example I were employed in a series of polymerizations in which various auxiliary emulsifiers, both of the fatty acid soap type and the sulfonate type, were employed in the amounts shown in Table IV. Addition of all the auxiliary emulsifiers listed in Table IV caused an increase in the rate of polymerization and a substantial reduction in the amount of preflocculation without significantly altering the desirable low viscosity of either the stripped or the concentrated latex. Unstripped latices with viscosities below 70 centipoises at about 48 percent solids were obtained when the amount of the potassium salt of dimerized linoleic acid used was progressively reduced from 3 to 2 parts and the amount of potassium laurate was progressively increased from 0 to 1 part.

EXAMPLE V

Polymerizations were run following the recipe and conditions of Example I except the ratio of butadiene to styrene was varied and the polymerization was carried to 100 percent conversion. A faster rate of polymerization and less preflocculation were observed as the proportion of the styrene was increased. Polymer surface titrations indicated a small increase in average particle size for the latices having the higher styrene contents. The high conversion latices of this example had a solids content of 56.5 percent as they came from the reaction vessel and were, as shown in Table V, extremely fluid, the viscosity increasing slightly as the styrene content was increased.

TABLE V.—EFFECT OF STYRENE CONTENT AND TOTAL CONVERSION

| Latex Sample | Butadiene/ Styrene Ratio | Unstripped Latex | | | | |
|---|---|---|---|---|---|---|
| | | Solids, Percent | Brookfield Viscosity (cp.)a | | | |
| | | | 6 R. P. M. | 12 R. P. M. | 30 R. P. M. | 60 R. P. M. |
| 93 | 70/30 | 56.5 | 86 | 81 | 76 | 73 |
| 94 | 37/63 | 56.5 | 88 | 88 | 92 | 91.5 |
| 95 | 33/67 | 56.5 | 100 | 97 | 90 | 87.5 | a Spindle No. 1.

These latices, after screening, were employed for the production of films by dipping forms in latex baths and thereafter drying the films. All of these films were clear, smooth, and entirely free of specks.

EXAMPLE VI

The recipe and conditions of Example I were followed in a series of polymerizations in which the percent of styrene in the monomeric material was progressively reduced to zero. These polymerizations followed the known tendency of low-styrene content recipes to polymerize relatively more slowly and to yield more floc than the higher styrene content recipes, but still gave reaction rates for polybutadiene (no styrene) which were faster at 5° C. than those obtained with presently used commercial recipes at 10° C. As shown in Table VI, use of a relatively pure stabilizer and an auxiliary emulsifier afforded satisfactory control of preflocculation, while still maintaining a desirable low viscosity.

EXAMPLE VII

Low viscosity, high solids latices containing monomer combinations other than butadiene-styrene or butadiene alone were prepared using the general recipe including 3.0 parts of the potassium salt of dimerized linoleic acid and a reaction temperature of 5° C. As shown in Table VII, the viscosities of such latices were quite low and comparable with 70–30 butadiene-styrene latices.

TABLE VII.—VARIATION IN MONOMER COMPOSITION

| Latex Sample | Monomer Composition a | Solids, Percent | Brookfield Viscosity b of Unstripped Latices | | | |
|---|---|---|---|---|---|---|
| | | | 6 R. P. M. | 12 R. P. M. | 30 R. P. M. | 60 R. P. M. |
| 105 | 30-Styrene | 46.5 | 46 | 45 | 42 | 38 |
| 106 | 25-Styrene / 5-Methyl methacrylate | 46.8 | 89 | 87 | 86 | 85 |
| 106a | 25-Styrene / 5-Methyl methacrylate | 45.0 / c 59.5 | 25 / 76 | 29 / 75 | 20 / 65 | 20 / 60 |
| 107 | 25-Styrene / 5-Acrylonitrile | 46.5 | 30 | 37 | 34 | 34 | a In wieght percent; all monomers contained 70 percent butadiene.
b In centipoises, spindle No. 1.
c Concentrated to this solids content.

A photomicrograph of sample 106a, made under the same conditions as Figs. 1, 2, 3 and 4 is shown in Fig. 5.

As stated above, when the polymerization of low temperature high solids latices of butadiene-styrene was attempted by using known recipes containing sufficient emulsifier to insure a commercially useful rate of reaction, the emulsions became viscous during the later portion of the reaction. (Low temperature is used herein in the sense of below room temperature, such as about 15° C. and lower, down to about −40° C.) In order to decrease the high viscosity of the emulsion, the amount of emulsifier in the initial charge has been reduced but this change in recipe has the undesirable effect of lengthening the reaction time and thus reducing the output possible from each reactor. In order to obtain increased rates of reaction in these reduced emulsifier recipes, commercial polymerization of this type of high solids latex has been carried out at 10° rather than 5° C. even though better strength in unloaded stocks is normally obtained with these latices as the polymerization temperature is lowered. The reaction times of commercial recipes are still uneconomically long and the viscosity of the latex during polymerization and after concentration to 60 percent solids is still higher than desired even when the slower recipes containing lower amount of emulsifier are used at the higher temperature.

In contrast, low temperature polymerizations effected in accordance with the present invention can employ

TABLE VI.—EFFECT OF LOW OR ZERO STYRENE CONTENT

| Latex Sample | Butadiene/ Styrene Ratio | Auxiliary Emulsifier | Hours to 80 Percent Conversiona | Prefloc, Percentb | Unstripped Latex | |
|---|---|---|---|---|---|---|
| | | | | | Solids, Percent | Viscosity (cp.)c |
| 96 | 70/30 | | 30.75 | 1.12 | 47.2 | 41–35 |
| 97 | 80/20 | | 33.75 | 1.66 | 48.2 | 46–37 |
| 98 | 90/10 | | 34.75 | 1.98 | 47.0 | 31–23 |
| 99 | 100/0 | | 35.25 | 2.18 | 48.5 | 39–27 |
| 100 | 100/0 | | 38.0 | 2.16 | 45.2 | 38–18 |
| 101d | 100/0 | | 22.5 | 0.25 | 50.1 | 70–40 |
| 102 | 100/0 | 0.5 K-laurate | 29.0 | 0.64 | 51.2 | 41–35 |
| 103 | 100/0 | 0.5 "Nacconol" NRSF | 23.25 | 0.58 | 49.7 | 48–32 |
| 104 | 100/0 | do | 21.0 | 0.10 | 51.2 | 66–46 | a At 5° C.
b Weight percent based on monomers.
c Brookfield viscosity in centipoises using spindle No. 1 at 6 and 60 R. P. M.
d "Daxad" 11-P used instead of "Daxad" 11.

larger amounts of initial emulsifier and, consequently, achieve a faster rate of polymerization, while simultaneously yielding such large particle size latices that they remain quite fluid throughout the polymerization and after concentration to above 60 percent solids. Additional improvements in the recipe, such as by use of a relatively low amount of inorganic salt and by use of a purified stabilizer, result in further reductions in the rate of polymerization while still yielding fluid emulsions, even though the polymerization is carried out at the lower and more desirable temperature of 5° C. These fluid latices are much more easily stripped of residual monomers than are the much more viscous latices now being produced. The much faster rate of polymerization made possible by these recipe changes results in a faster rate of polymerization at 5° C. than formerly was obtained at 10° C. with the improvement in physical properties which accompany polymerization at lower temperatures, all of which is demonstrated in the above examples.

Type V latex. After bomb and oven aging of both types of films, the tensile and tear properties of films from blends containing the rapidly polymerized latex were superior to those of films containing the Type V latex.

EXAMPLE IX

The general recipe and procedure was employed for polymerization of butadiene-styrene and polybutadiene latices run under the conditions shown in Table VIII. The viscosities of the emulsions during polymerization and of the unstripped latices from these runs that were measured were low (for example, unstripped latex example 108 had a Brookfield viscosity of 80 centipoises at 6 R. P. M. and 69 centipoises at 60 R. P. M. using a No. 1 spindle). No difficulties due to high viscosity during polymerization were encountered in any of these runs. The average diameters of the particles in the latex samples measured (127–130) were of the order of 20,000 A. and greater and the diameters were in the range of about 13,000 to about 70,000 A.

TABLE VIII.—HIGH TEMPERATURE POLYMERIZATION OF BUTADIENE-STYRENE OR POLYBUTADIENE LATICES AT VARIOUS CONDITIONS

| Latex Sample | Butadiene/ Styrene Ratio | Temp., °C. | Recipe (parts by weight) | | | | Conversion | | Unstripped Latices | | |
|---|---|---|---|---|---|---|---|---|---|---|---|
| | | | Water | K-Dimer Acid | Daxad-11 | Na₂SO₄ | Percent | Hours | Solids, Percent | Relative Particle Surface [a] | Diameter of Particles.[b] In A. |
| 108 | 37/63 | 40 | 80 | 3.0 | 1.5 | 0.5 | 96 | 5.25 | 56.5 | | |
| 109 | 37/63 | 50 | 80 | 3.0 | 1.5 | 0.5 | 96 | 4.0 | 56.4 | 3.94 | |
| 110 | 70/30 | 50 | 80 | 3.0 | 1.5 | 0.5 | 96 | 4.75 | 56.4 | | |
| 110A | 70/30 | 40 | 80 | 3.0 | 1.5 | 0.5 | 95 | 6.5 | 53.9 | | |
| 111 | 37/63 | 50 | 80 | 3.0 | 1.5 | 0.5 | 96.5 | 4.5 | 56.7 | 3.57 | |
| 112 | 37/63 | 50 | 95 | 3.0 | 1.5 | 0.5 | 96 | 4.5 | | 3.51 | |
| 113 | 37/63 | 50 | 110 | 3.0 | 1.5 | 0.5 | 97 | 4.5 | 47.4 | 3.49 | |
| 114 | 37/63 | 50 | 80 | 3.0 | 1.5 | 0.5 | 97 | 4.75 | | 3.74 | |
| 115 | 37/63 | 50 | 80 | 3.0 | 1.0 | 0.5 | 96.5 | 4.75 | | | |
| 116 | 37/63 | 50 | 80 | 3.0 | 0.5 | 0.5 | 96 | 4.75 | | 4.12 | |
| 118 | 37/63 | 50 | 80 | 3.0 | 1.5 | 0.5 | 96.5 | 4.5 | | 3.57 | |
| 119 | 37/63 | 50 | 80 | 3.0 | 1.5 | 0.5 | 97 | 4.75 | | 3.74 | |
| 120 | 37/63 | 50 | 80 | 3.0 | 1.5 | 0.25 | 96 | 4.25 | | 3.96 | |
| 121 | 37/63 | 50 | 80 | 3.0 | 1.5 | 0.0 | 97 | 4.25 | | | |
| 123 | 37/63 | 50 | 110 | 3.0 | 1.5 | 0.5 | 97 | 4.5 | | | |
| 124 | 37/63 | 50 | 110 | 3.0 | 0.5 | 0.5 | 93.6 | 4.5 | | | |
| 125 | 37/63 | 50 | 110 | 3.0 | 0.5 | 0.25 | 96.5 | 4.5 | | | |
| 127 | 37/63 | 50 | 80 | 3.0 | 1.5 | 0.5 | 95.6 | 4.0 | 56.8 | 3.53 | 13,200–26,400 |
| 128 | 37/63 | 50 | 80 | 1.5 | 1.5 | 0.5 | 95.4 | 7.75 | 55.7 | 2.16 | 26,400–39,600 |
| 129 | 37/63 | 50 | 80 | 1.0 | 1.5 | 0.5 | 93.0 | 9.75 | 54.2 | 1.44 | 46,200–52,800 |
| 130 | 37/63 | 50 | 80 | 0.5 | 1.5 | 0.5 | 77 | 9.75 | 48.7 | 1.50 | 66,000 |
| 141 | 100/0 | 50 | 80 | 3.0 | 1.5 | 0.5 | 80 | 2.6 | 47.8 | | |
| 142 | 100/0 | 40 | 80 | 3.0 | 1.5 | 0.5 | 80 | 4.25 | 47.6 | | |

[a] Measured by conductometric titration, using potassium salt of dimerized linoleic acid, in weight percent of the total of such salt, including that present during polymerization, to saturate surface of polymer, based on total latex solids.
[b] Visible with 950X microscope.

EXAMPLE VIII

When the 70/30 butadiene/styrene recipe used in Example I was employed in a number of polymerizations carried out at 50° instead of 5° C., essentially complete conversion to 56.5 percent solids was obtained in about 5 hours, and the latices remained fluid throughout the reaction. Unstripped latices from these rapid polymerizations had solids contents of 55–57 percent and Brookfield viscosities of 170 centipoises or less. These polymerizations are very rapid compared with the long slow preparation of Type V (GR–S 2003) latex (70–30 butadiene/styrene latex polymerized at 50–60° C., as a part of the Government Rubber Program), which requires 50–70 hours in a troublesome, seeded, multiple injection system. Reduction in water in the polymerization recipe of Table I to 70 parts permitted polymerization to 59.2 percent solids in 6 hours at 50° C., which solids content complies with the specification for Type V latex.

In order to evaluate this rapidly polymerized latex, 0–50 percent of it was blended with natural latex for comparison with similar blends containing commercial Type V latex. These were compounded in the same gum stock recipe. All samples were straight dipped and approximately 0.012 inch films were obtained for stress-strain evaluation. The tensile and tear properties of unaged films from blends containing this rapidly polymerized latex were comparable to those containing the As can be seen from an inspection of Table VIII, latices of about 45 percent total solids or more were polymerized in the temperature range of about 40 to 50° C. in less than 10 hours when the amount of emulsifier was in the preferred range of about 1 to 3 parts of emulsifier per 100 parts by weight of monomeric material.

EXAMPLE X

The general recipe and procedure were employed, except for the use of 0.3 part of sodium sulfate, for polymerization of 70 parts of butadiene and 30 parts of styrene at 5° C., using the potassium salt of hydrogenated dimerized linoleic acid. Such hydrogenation was effected so as to saturate the ethylenic bonds in the dimerized linoleic acid referred to above and hence yielded a product which was principally a dicarboxylic acid derivative of a saturated hydrocarbon having a carbon skeleton which is partially cyclic (i. e., a substituted cycloalkane).

The monomeric material was 81.7 percent converted to polymer in 19.6 hours which is an improvement over the approximately 30 hours required for the same conversion when using the unsaturated dimerized linoleic acid; e. g., see latex sample 15, Table III. Additionally, it is to be noted that the rate of polymerization using the hydrogenated dimerized acid is 2.5 times faster than that of the commercial product X–635, even though the latter is run at a higher temperature (10° C. instead of 5° C.).

The viscosity of the latex prepared from the above polymerization was quite low, even after concentration to over 60 percent solids, as shown in the following table.

TABLE IX.—VISCOSITIES OF LATICES PREPARED USING THE POTASSIUM SALT OF HYDROGENATED DIMERIZED LINOLEIC ACID

| Sample | Solids, Percent[b] | Brookfield Viscosity[a] | | | |
|---|---|---|---|---|---|
| | | 6 R. P. M. | 12 R. P. M. | 30 R. P. M. | 60 R. P. M. |
| Degassed latex | 48.5 | 170 | 125 | 85 | 67 |
| Concentrated latex | 60.1 | 189 | 133 | 83 | 62 |

[a] In centipoises, using spindle No. 1.
[b] Weight percent, based on monomers.

A photomicrograph of the degassed latex, prepared under the identical conditions as were used in preparing Figs. 1, 2, and 3, is shown in Fig. 4.

EXAMPLE XI

A polymerization was carried out under the conditions identical to those of Example X, except that the emulsifying agent used was the potassium salt of polymerized linoleic acid having a high trimer content (about 60 percent). Although the high trimer content salt did not emulsify the monomeric material as well as did the lower trimer content salt used in the bulk of the examples and polymerization was not as rapid when it was used, the latex produced was very fluid. A degassed sample of 46.9 percent solids content had a Brookfield viscosity of 52 centipoises at 6 R. P. M. and 37.3 centipoises at 60 R. P. M., while a concentrated sample of 60.1 percent solids had viscosities of 95 and 60.8 centipoises at the stated speeds (all measured with spindle No. 1). These data indicate that the alkali salt of the trimer of linoleic is effective in the preparation of high solids latices having low viscosities.

A photomicrograph of the degassed latex, prepared under the identical conditions as were used in preparing Figs. 1, 2, 3, 4 and 5, is shown in Fig. 6.

It is to be noted that all of the latices prepared in accordance with the present invention as set forth in the preceding examples had low viscosities (less than about 200 centipoises and generally less than about 150 centipoises) at high total solids contents (up to about 55 percent) whether prepared at high temperatures (in the range of about 30° to 100° C.) or at low temperatures (less than about 15° C.). All of the latices prepared by polymerization in the low temperature range and concentrated to 60 percent total solids or more also had viscosities less than about 200 centipoises and generally less than about 150 centipoises. Moreover, the rate of polymerization was considerably greater than known processes for producing latices of similar properties in both low and high temperature ranges. Unusually large latex particles were produced from monomeric material consisting principally of at least one polymerizable vinyl compound selected from the group consisting of the low molecular diolefins and vinyl aromatics by either low or high temperature polymerization. Such large latex particles were visible under 950 times magnification and had diameters in the range of about 7,000 to 66,000 A., with average diameters of the order of about 20,000 A. or greater. All of these improvements were effected while producing latices which compared favorably with known commercial latices with regard to the physical characteristics normally desired (tensile or tear strength of deposited films, ageing and blending properties etc.).

Although the present invention has been described with particularity with reference to preferred embodiments and various modifications thereof, it will be obvious to those skilled in the art, after understanding the invention, that various changes and other modifications may be made therein without departing from the spirit and scope of the invention and the appended claims should therefore be interpreted to cover such changes and modifications.

We claim as our invention:

1. In a process wherein monomeric material selected from the group consisting of polymerizable low molecular weight diolefins and mixtures of at least one such diolefin and at least one polymerizable ethylenic monomer selected from the group consisting of esters of acrylic and substituted acrylic acids, acrylonitrile and derivatives thereof and vinyl aromatic hydrocarbons is polymerized in an aqueous alkaline emulsion system, the method of preparing an emulsion having a high solids content at the termination of polymerization which comprises employing the polybasic polymer of an unsaturated acyclic aliphatic carboxylic acid having at least 10 carbon atoms, said polymer having a molecular weight of less than about 1000, to emulsify said monomeric material during polymerization in a system containing an amount of monomeric material at least equal in weight to the weight of the aqueous phase and continuing the polymerization reaction until the total solids comprise at least about forty percent of the total emulsion.

2. The method of claim 1 in which the acyclic acid from which the polybasic polymer is derived is polyunsaturated and said polybasic polymer is unsaturated.

3. The method of claim 1 in which the polybasic polymer is principally a dimer.

4. The method of claim 3 in which the acyclic acid from which the dimer is derived is an octadecadienoic acid.

5. The method of claim 1 in which said polybasic polymer comprises the trimer of an octadecadienoic acid.

6. In a process wherein monomeric material selected from the group consisting of polymerizable low molecular weight diolefins and mixtures of at least one such diolefin and at least one polymerizable ethylenic monomer selected from the group consisting of esters of acrylic and substituted acrylic acids, acrylonitrile and derivatives thereof and vinyl aromatic hydrocarbons is polymerized in an aqueous alkaline emulsion system, the improvement which comprises employing an emulsifier comprising the hydrogenated dimer of an octadecadienoic acid to emulsify said monomer material during polymerization.

7. The improvement of claim 6 in which the octadecadienoic acid is linoleic acid.

8. In a process wherein monomeric material selected from the group consisting of polymerizable low molecular weight diolefins and mixtures of at least one such diolefin and at least one polymerizable ethylenic monomer selected from the group consisting of esters of acrylic and substituted acrylic acids, acrylonitrile and derivatives thereof and vinyl aromatic hydrocarbons is polymerized in an aqueous alkaline emulsion system, the method of preparing a latex of the polymer of said monomeric material having a high solids content at the termination of polymerization which comprises employing between about 0.3 to 5 parts by weight to 100 parts by weight of monomer of an alkali salt of the dimer of an octadecadienoic acid to emulsify said monomeric material during polymerization in a system containing an amount of monomeric material at least equal in weight to the weight of the aqueous phase and continuing the polymerization reaction until the total solids comprises at least forty percent of the total emulsion.

9. The method of claim 8 in which said monomeric material consists principally of a polymerizable mixture of low molecular weight conjugated diolefin and vinyl aromatic hydrocarbon, polymerization is effected below 15° C. and is continued until the total solids comprise at least forty-five percent of the emulsion, and the Brookfield viscosity of the unstripped latex produced thereby is less than about 200 centipoises.

10. The method of claim 9 in which the system contains between about 0.1 to 0.3 part by weight of added inorganic salt per 100 parts by weight of monomer.

11. The method of claim 8 in which the polymerization is effected at a temperature in the range of about 30° to 100° C.

12. The method of claim 8 in which said monomeric material consists principally of a mixture of low molecular weight conjugated diolefin and vinyl aromatic hydrocarbon, the polymerization is effected at a temperature in the range of about 40° to 50° C. using between about 1 to 3 parts of said alkali salt and at least 90 percent of the monomeric material present is polymerized in less than 10 hours.

13. In a process wherein monomeric material selected from the group consisting of polymerizable low molecular weight diolefins and mixtures of at least one such diolefin and at least one polymerizable ethylenic monomer selected from the group consisting of esters of acrylic and substituted acrylic acids, acrylonitrile and derivatives thereof and vinyl aromatic hydrocarbons is polymerized in an aqueous alkaline emulsion system to yield a stable emulsion having a high concentration of the polymeric product, the improvement which comprises employing the dimer of linoleic acid to emulsify said monomeric material during polymerization, and continuing the polymerization reaction until the total amount of polymeric product comprises not less than about forty percent of the total emulsion.

References Cited in the file of this patent

UNITED STATES PATENTS

| | | |
|---|---|---|
| 2,300,566 | Hahn et al. | Nov. 3, 1942 |
| 2,481,876 | Rhines | Sept. 13, 1949 |
| 2,579,908 | Davison et al. | Dec. 25, 1951 |
| 2,635,086 | Norris | Apr. 14, 1953 |

OTHER REFERENCES

Willis: Ind. and Eng. Chem. (pp. 2272–76), October 1949.

Feldon et al.: Ind. and Eng. Chem. (pp. 1662–64), July 1952.